(12) United States Patent
Amineh et al.

(10) Patent No.: US 10,761,060 B2
(45) Date of Patent: Sep. 1, 2020

(54) REDUCING EFFECTS OF PIPE COUPLINGS IN CORROSION INSPECTION OF PIPES

(71) Applicant: Halliburton Energy Services, Inc., Houston, TX (US)

(72) Inventors: Reza Khalaj Amineh, Houston, TX (US); Luis Emilio San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/736,479

(22) PCT Filed: Nov. 6, 2016

(86) PCT No.: PCT/US2016/060752
§ 371 (c)(1),
(2) Date: Dec. 14, 2017

(87) PCT Pub. No.: WO2018/084864
PCT Pub. Date: May 11, 2018

(65) Prior Publication Data
US 2019/0064117 A1    Feb. 28, 2019

(51) Int. Cl.
*G01N 27/90* (2006.01)
*G01B 7/06* (2006.01)
*G01N 17/00* (2006.01)

(52) U.S. Cl.
CPC ......... *G01N 27/9073* (2013.01); *G01B 7/10* (2013.01); *G01N 17/006* (2013.01); *G01N 27/9046* (2013.01)

(58) Field of Classification Search
CPC ..... G01N 17/006; G01N 27/9046; G01B 7/10
See application file for complete search history.

(56) References Cited

U.S. PATENT DOCUMENTS

| 5,233,297 A | * | 8/1993 | Lara | ...................... E21B 47/082 |
| | | | | 324/220 |
| 7,960,969 B2 | | 6/2011 | Mouget et al. | |

(Continued)

FOREIGN PATENT DOCUMENTS

| WO | 2015157270 | 10/2015 |
| WO | WO 2015/157270 | * 10/2015 |
| WO | 2017196357 | 11/2017 |

OTHER PUBLICATIONS

S. M. Haugland, "Fundamental analysis of the remote-field eddy-current effect", IEEE Transactions on Magnetics, vol. 32, No. 4, pp. 3195-3211, Jul. 1996.

(Continued)

*Primary Examiner* — Alvaro E Fortich
(74) *Attorney, Agent, or Firm* — John Wustenberg; C. Tumey Law Group PLLC

(57) ABSTRACT

Systems and methods for reducing effects of pipe couplings in electromagnetic log data. A method for corrosion detection comprises disposing an electromagnetic logging tool within a plurality of concentric pipes in a wellbore; obtaining electromagnetic log data along the concentric pipes; and identifying a location of at least one pipe coupling on at least one of the concentric pipes; and processing the electromagnetic log data to determine one or more attribute of the concentric pipes as a function of depth, wherein the processing uses the location of at least one pipe coupling to account for effect of the at least one pipe coupling on the electromagnetic log data.

19 Claims, 9 Drawing Sheets

(56) References Cited

U.S. PATENT DOCUMENTS

| | | |
|---|---|---|
| 9,488,749 B2 | 11/2016 | Amineh et al. |
| 9,512,712 B2 | 12/2016 | Donderici et al. |
| 9,562,877 B2 | 2/2017 | Amineh et al. |
| 9,745,845 B2 | 8/2017 | San Martin et al. |
| 2002/0104653 A1* | 8/2002 | Hosie ............. E21B 47/09 166/254.2 |
| 2002/0162596 A1* | 11/2002 | Simpson ............ E21B 17/18 138/98 |
| 2009/0195244 A1 | 8/2009 | Mouget et al. |
| 2012/0095686 A1 | 4/2012 | Legendre et al. |
| 2013/0299164 A1* | 11/2013 | Dale ............... E21B 17/18 166/250.01 |
| 2014/0163887 A1* | 6/2014 | Wu ................ E21B 47/022 702/7 |
| 2015/0219601 A1 | 8/2015 | Davydov et al. |
| 2016/0040529 A1* | 2/2016 | Sitka ............. E21B 47/18 367/84 |
| 2016/0069842 A1 | 3/2016 | Bonavides et al. |
| 2016/0187523 A1 | 6/2016 | San Martin et al. |
| 2016/0282503 A1 | 9/2016 | Hou et al. |
| 2016/0320769 A1* | 11/2016 | Deffenbaugh ......... E21B 47/06 |
| 2017/0101865 A1 | 4/2017 | Amineh et al. |
| 2017/0131239 A1 | 5/2017 | Amineh et al. |
| 2017/0138132 A1 | 5/2017 | Wilson et al. |
| 2017/0145757 A1* | 5/2017 | Ayasse ............. E21B 17/18 |
| 2017/0248730 A1 | 8/2017 | San Martin et al. |
| 2018/0074220 A1* | 3/2018 | David .............. G01V 3/38 |

OTHER PUBLICATIONS

J. Garcia et al., "Successful application of a new electromagnetic corrosion tool for well integrity evaluation in old wells completed with reduced diameter tubular," IPTC 16997. Dated Mar. 26-28, 2013.

A. A. Arbuzov et al., "Memory magnetic imaging defectoscopy," SPE 162054 dated Oct. 16-18, 2012.

International Search Report and Written Opinion for Application No. PCT/US2016/060752 dated Jul. 13, 2017.

\* cited by examiner

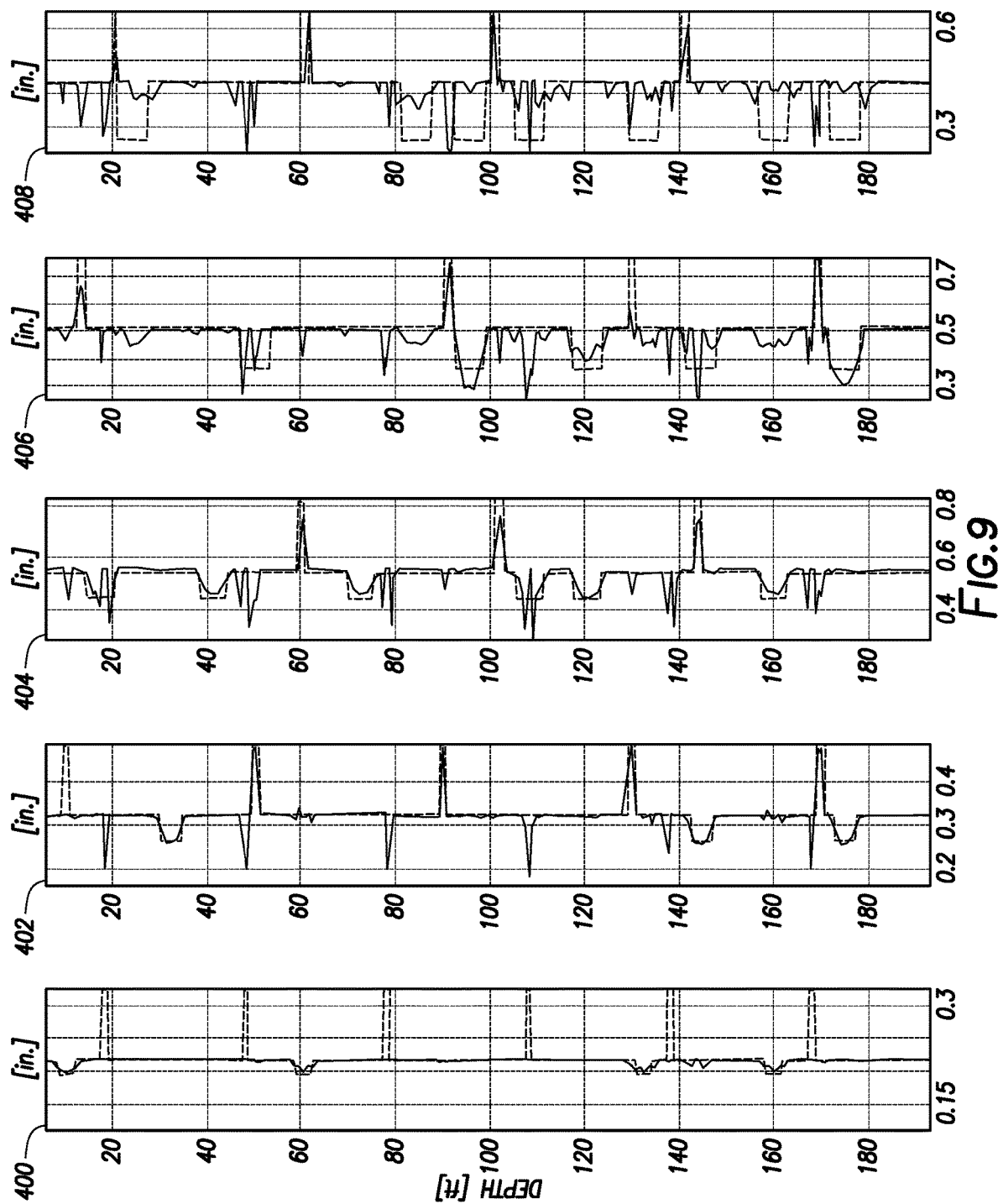

REDUCING EFFECTS OF PIPE COUPLINGS IN CORROSION INSPECTION OF PIPES

BACKGROUND

For oil and gas exploration and production, a network of wells, installations and other conduits may be established by connecting sections of metal pipe together. For example, a well installation may be completed, in part, by lowering multiple sections of metal pipe (e.g., a pipe string) into a borehole, and cementing the casing string in place. In some well installations, multiple pipes are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of EM logging tool uses electromagnetic (EM) fields to estimate pipe thickness or other corrosion indicators. As an example, an EM logging tool may collect EM log data, where the EM log data may be interpreted to correlate a level of flux leakage or EM induction with corrosion. When multiple casing strings are employed together, correctly managing corrosion detection EM logging tool operations and data interpretation may be complex. Periodic pipe couplings that connect pipe segments together may complicate the data interpretation. Pipe couplings may include threaded collars that connect two pipe segments to one another.

BRIEF DESCRIPTION OF THE DRAWINGS

These drawings illustrate certain aspects of some examples of the present disclosure, and should not be used to limit or define the disclosure.

FIG. 9 is an example of another thickness log.

DETAILED DESCRIPTION

This disclosure may generally relate to systems and methods for reducing effects of pipe couplings in electromagnetic ("EM") log data. Once EM log data corresponding to different concentric pipes is collected, it may be processed. The processing of EM log data may be performed downhole and/or at the Earth's surface to derive attributes (e.g., pipe thickness, pipe conductivity, and/or pipe permeability) for a pipe as a function of depth. The derived attributes can further be correlated with one or more types of corrosion and/or with a corrosion index. If corrosion of a particular pipe is determined to exceed a threshold, a corrective action may be performed. Example corrective actions may include enhancing, repairing, or replacing at least part of a pipe segment. Additionally or alternatively, a treatment can be applied to reduce the rate of corrosion for at least part of a pipe segment.

When processing EM log data for concentric multi-string arrangements that include multiple concentric pipes (e.g., two or more), the presence of pipe couplings can complicate the inversion process. In particular, thickness estimations on outer pipes may include errors due to a ghosting effect caused by pipe couplings on interior pipes. To reduce the effect of pipe couplings, properties of the pipe couplings may be used in the inversion process. These properties may include, but are not limited to, one or more of position, dimensions, and/or electrical properties of the pipe couplings. The position of the pipe couplings may be estimated. By including the coupling properties in the inversion process, the errors due to pipe couplings may be reduced, and possible eliminated, thus improving the accuracy of the resultant attributes derived from the processing of the EM log data.

Figure 1:
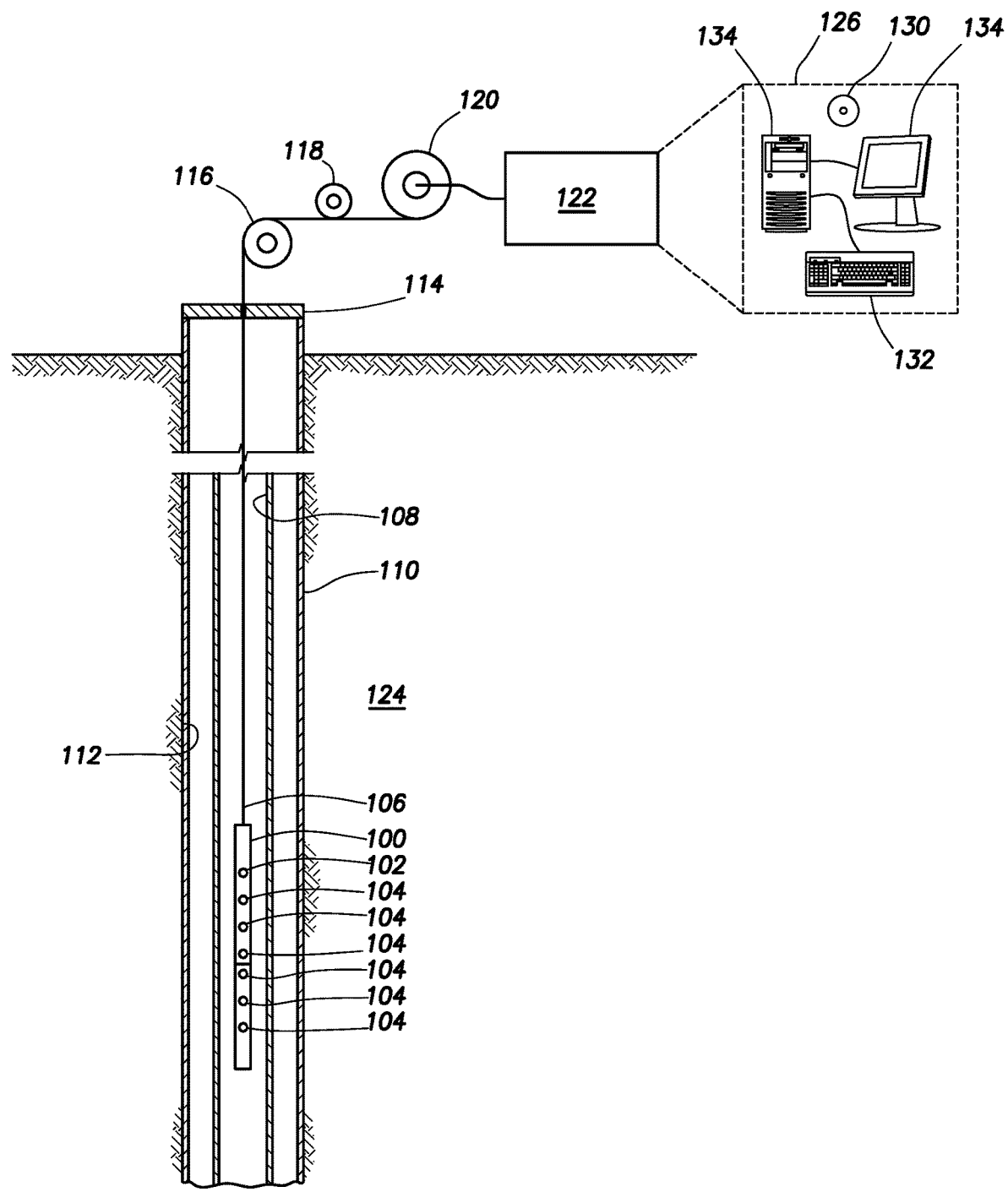
FIG. 1 is a schematic illustration of an example operating environment for an EM logging tool.

FIG. 1 illustrates an operating environment for a EM logging tool 100 as disclosed herein. EM logging tool 100 may comprise transmitter 102 and receivers 104. EM logging tool 100 may be operatively coupled to a conveyance 106 (e.g., wireline, slickline, coiled tubing, pipe, drill pipe, downhole tractor, or the like) which may provide mechanical suspension, as well as electrical connectivity, for EM logging tool 100. Conveyance 106 and EM logging tool 100 may extend within inner pipe 108 and outer pipe 110 to a desired depth within the wellbore 112. Conveyance 106, which may include one or more electrical conductors, may exit wellhead 114, may pass around pulley 116, may engage odometer 118, and may be reeled onto winch 120, which may be employed to raise and lower the EM logging tool 100 in the wellbore 112. Signals recorded by EM logging tool 100 may be stored on memory and then processed by display and storage unit 122. The processing may be performed real-time during data acquisition of after recovery of EM logging tool 100 from wellbore 112. Processing may alternatively occur downhole. Alternatively, signals recorded by EM logging tool 100 may be conducted to display and storage unit 122 by way of conveyance 106. Display and storage unit 122 may process the signals, and the information contained therein may be displayed for an operator to observe and stored for future processing and reference. Display and storage unit 122 may also contain an apparatus for supplying control signals and power to the downhole tool assembly, wherein the downhole tool assembly comprises EM logging tool 100.

FIG. 1 also illustrates a inner pipe 108, which may be positioned inside of outer pipe 110 extending part of the distance down wellbore 112. Pipe 122 may be production tubing, tubing string, casing string, or other pipe disposed within second casing string 110. The EM logging tool 100 may be dimensioned so that it may be lowered into the wellbore 110 through the outer pipe 110, thus avoiding the difficulty and expense associated with pulling the pipe 110 out of the wellbore 112. First casing string 108 and second casing string 110 may each comprise a plurality of joints or segments of pipe, each segment being connected to the adjacent segments by a pipe coupling, such as a threaded collar or other suitable pipe coupling.

In logging systems, such as, for example, logging systems utilizing the EM logging tool 100, a digital telemetry system may be employed, wherein an electrical circuit may be used to both supply power to the EM logging tool 100 and to transfer data between display and storage unit 120 and EM logging tool 100. A DC voltage may be provided to the EM logging tool 100 by a power supply located above ground level, and data may be coupled to the DC power conductor by a baseband current pulse system. Alternatively, the EM logging tool 100 may be powered by batteries located within the downhole tool assembly, and/or the data provided by the EM logging tool 100 may be stored within the downhole tool assembly, rather than transmitted to the surface during logging (e.g., defect detection).

EM logging tool 100 may be used for excitation of transmitter 102. Transmitter 102 may transmit magnetic fields into subterranean formation 124. The magnetic fields from transmitter 102 may be referred to as a primary magnetic field. The primary magnetic fields may produce Eddy currents in the inner pipe 108 and the outer pipe 110. These Eddy currents, in turn, produce secondary magnetic fields that may be sensed along with the primary magnetic fields by the receivers 104. Characterization of the inner pipe 108 and outer pipe 110, including determination of pipe attributes, may be performed by measuring and processing these magnetic fields. Pipe attributes may include, but are not limited to, pipe thickness, pipe conductivity, and/or pipe permeability. Non-limiting examples of suitable transmitters 102 may include a coil, a wire antenna, a toroidal antenna, or azimuthal button electrode. As an example, receivers 104 may include receiver coils (e.g., tilted receiver coils), magnetometer receivers, wire antenna, toroidal antenna or azimuthal button electrodes.

Transmission of electromagnetic fields by the transmitter 102 and the recordation of signals by the receivers 104 may be controlled by display and storage unit 122, which may include an information handling system 126. As illustrated, the information handling system 126 may be a component of the display and storage unit 120. Alternatively, the information handling system 126 may be a component of EM logging tool 100. An information handling system 126 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 126 may be a personal computer, a network storage device, or any other suitable device and may vary in size, shape, performance, functionality, and price. The information handling system 126 may include a processing unit 128 (e.g., microprocessor, central processing unit, etc.) that may process EM log data by executing software or instructions obtained from a local or remove non-transitory computer readable media 130 (e.g., optical disks, magnetic disks). The computer readable media 130 may store software or instructions of the methods described herein. Non-transitory computer readable media 130 may include any instrumentality or aggregation of instrumentalities that may retain data and/or instructions for a period of time. Non-transitory computer-readable media 125 may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing The information handling system 126 may also include input device(s) 132 (e.g., keyboard, mouse, touchpad, etc.) and output device(s) 134 (e.g., monitor, printer, etc.). The input device(s) 132 and output device(s) 134 provide a user interface that enables an operator to interact with EM logging tool 100 and/or software executed by processing unit 128. For example, the information handling system 126 may enable an operator to select analysis options, view collected log data, view analysis results, and/or perform other tasks.

Figure 2:
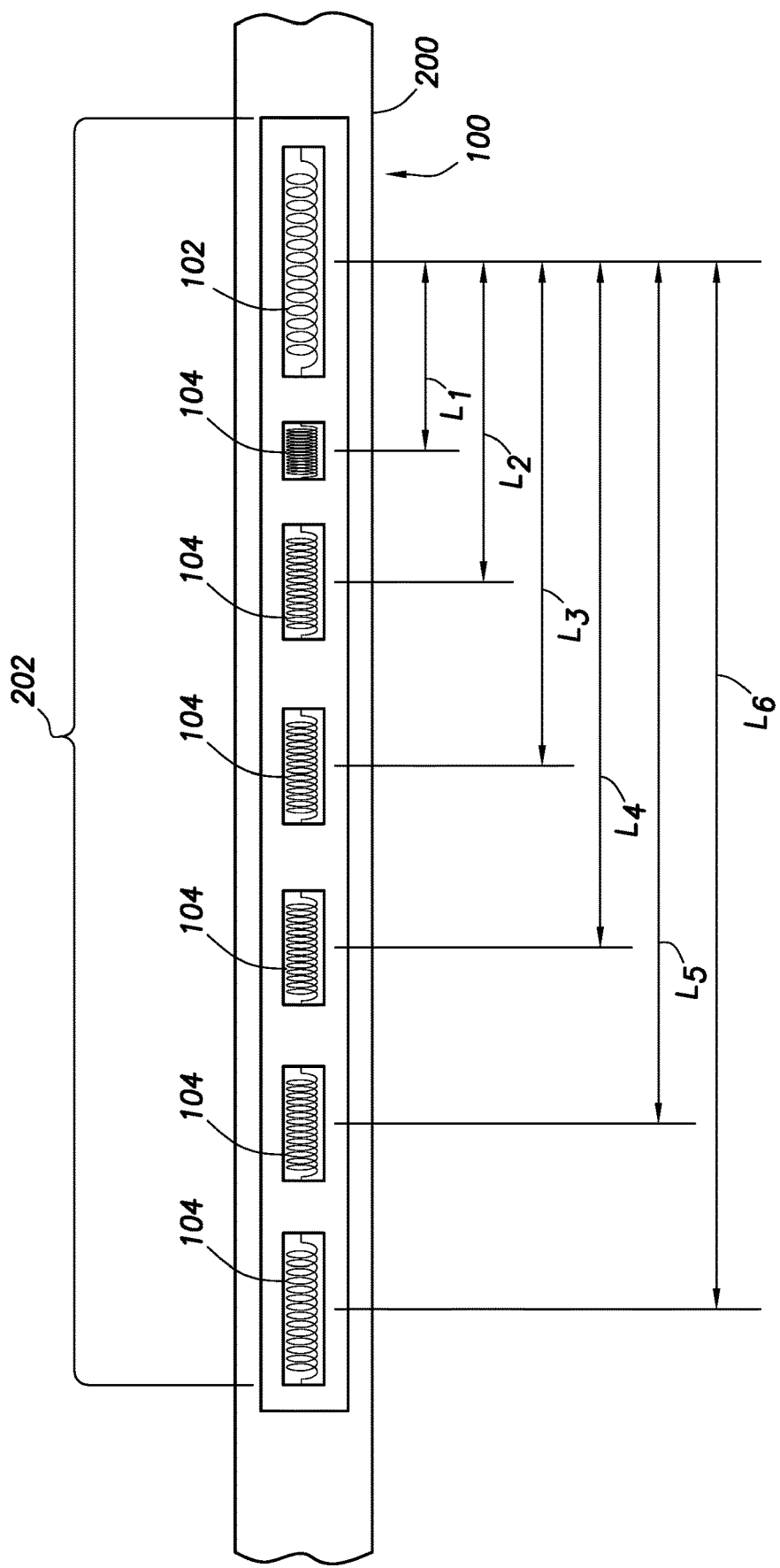
FIG. 2 is a schematic illustration of an example EM logging tool.

FIG. 2 is a schematic illustration of an example of EM logging tool 100. As illustrated, EM logging tool 100 may include tool body 200 on which a sensor array 202 may be positioned. Sensor array 202 may include transmitter 102 and receivers 104 coupled to tool body 200. As illustrated, the receivers 104 may be positioned on the corrosion detection tool 100 at selected distances (axial spacing) away from the transmitter 102, shown on FIG. 2 as $L_1$ to $L_6$ for each of the six receivers 104, wherein $L_1 < L_2 < L_3 < L_4 < L_5 < L_6$. The axial spacing of the receivers 104 from the transmitters 102 may vary, for example, from about 0 inches (0 cm) to about 40 inches (101.6 cm) or more. It should be understood that the configuration of EM logging tool 100 shown on FIG. 2 is merely illustrative and other configurations of EM logging tool 100 may be used with the present techniques. While FIG. 2 shows only a single sensor array 202, there may be multiple sensor arrays 202 where the distance between transmitters 102 and receivers 104 in each of the sensor arrays 202 may vary. In addition, EM logging tool 100 may include more than one transmitter 102 and more or less than six of the receivers 104. In addition, transmitter 102 may be a coil implemented for transmission of magnetic field while also measuring electromagnetic fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a pipe (e.g., inner pipe 108 on FIG. 1) and a separated along the tool axis. Alternatively, EM logging tool 100 may include a transmitter 102 and receiver 104 that are in the form of coils or solenoids coaxially positioned within a pipe (e.g., inner pipe 108 on FIG. 1) and collocated along the tool axis.

Figure 3:
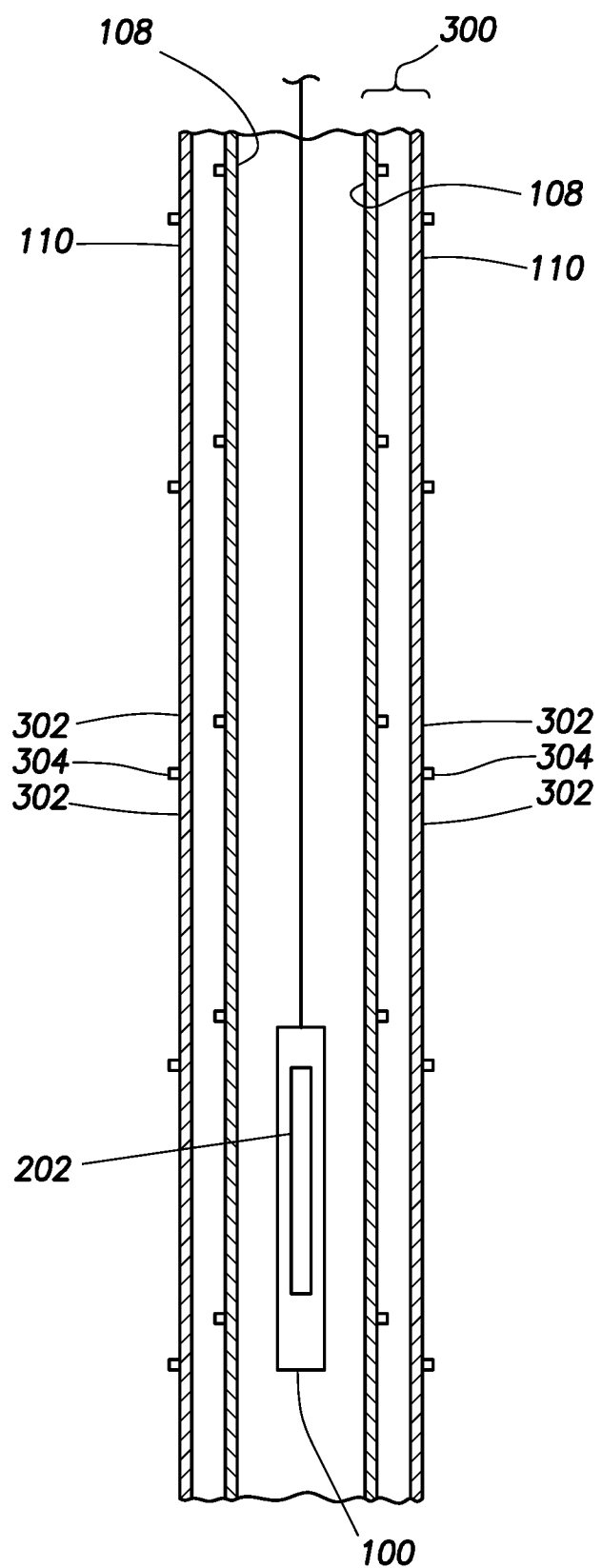
FIG. 3 is a schematic illustration of an example multi-pipe configuration for an EM logging tool.

FIG. 3 is a schematic illustration of an example multi-pipe configuration for EM logging tool 100. As illustrated, EM logging tool 100 comprising sensor array 202 may be positioned within concentric pipes 300. Concentric pipes 300 may comprise inner pipe 108 and outer pipe 110. While concentric pipes 300 on FIG. 3 include only two pipes, inner pipe 108 and outer pipe 110, it should be understood that a multi-pipe configuration for EM logging tool 100 may include two, three, four, five, or more concentric pipes. Each of inner pipe 108 and outer pipe 110 may include pipe segments 302 connected end to end. As illustrated, pipe couplings 304 may couple adjacent ones of pipe segments 302 to one another. Non-limiting examples of pipe couplings 304 may include threaded collars. The length of the pipe segments 302 may or may not be known. The position of the pipe couplings 304 may be periodic along the length of the well for each of the concentric pipes 300. The periodicity of the pipe couplings 304 may vary depending on the particular pipes that were used and may even vary on a particular pipe. While the pipe segments 302 may have lengths ranging from about 20 ft (6.1 m) to about 50 ft (15.2 m) with pipe couplings 304 connecting adjacent pipe segments, it should be understood that the multiple concentric pipes may have pipe segments 302 outside these ranges. Measurements from sensor array 202 may be processed to determine attributes of the inner pipe 108 and outer pipe 110.

EM logging tool 100 may use any suitable EM technique for inspection of concentric pipes 300. Non-limiting examples of suitable EM techniques may be broadly classified in the following two categories: 1) techniques based on magnetic flux leakage ("MFL") and 2) techniques based on Eddy current ("EC"). While MFL techniques may be suitable for using inspection of a single pipe, EC techniques may be particularly suited for characterization of a multi-string arrangement in which concentric pipes 300. EC techniques may include, but are not limited to, frequency-domain EC techniques and time-domain EC techniques.

In frequency domain EC techniques, transmitter 102 (e.g., shown on FIG. 2) of EM logging tool 100 may be fed by a continuous sinusoidal signal, producing primary magnetic fields that illuminate the concentric pipes 300, including the inner pipe 108 and outer pipe 110. The primary magnetic fields produce Eddy currents in the concentric pipes 300. These Eddy currents, in turn, produce secondary magnetic fields that may be sensed along with the primary magnetic fields by the receivers 104 (e.g., shown on FIG. 2). Characterization of the concentric pipes 300, including the inner pipe 108 and outer pipe 110, may be performed by measuring and processing these magnetic fields.

In time domain EC techniques, which may also be referred to as pulsed EC ("PEC"), the transmitter 102 (e.g., shown on FIG. 2) may be fed by a pulse. Similar to the frequency domain EC technique, transient primary magnetic fields may be produced due the transition of the pulse from "off" to "on" state or from "on" to "off" state (more common). These transient magnetic fields produce Eddy currents in the concentric pipes 300, including the inner pipe 108 and outer pipe 110. The Eddy currents, in turn, produce secondary magnetic fields that may be measured by a receiver 104 placed at some distance on the EM logging tool 100 from the transmitter 102, as shown on FIG. 2. Alternatively, the secondary magnetic fields may be measured by a co-located receiver (not shown) or with the transmitter 102 itself.

One-dimensional (1D) forward and inversion models may be used to calculate pipe attributes of a multi-string arrangement, such as the two-string example of FIG. 3 that includes inner pipe 108 and outer pipe 110. For the two-string example of FIG. 3, pipe wall thickness parameters may be assumed to be uniform along the axial direction. If pipe materials are known, the attributes to be determined for the inner pipe may include outer diameter (OD1), pipe wall thickness (h1), electrical conductivity ($\sigma$1), and/or magnetic permeability ($\mu$1). Similarly, the attributes to be determined for the outer pipe 110 may include outer diameter (OD2), tubing wall thickness (h2), electrical conductivity ($\sigma$2), and/or magnetic permeability ($\mu$2). To calculate the tubing wall thickness, a numerical optimization (e.g., a Gauss-Newton method) may be employed. In such case, unknown parameters may be adjusted until the misfit error between measurement data and predicted data (computed via forward modeling using estimated parameters) is sufficiently small. This goal can be achieved by iteratively solving a non-linear problem that minimizes the objective cost function:

$$\ell(X) = \tfrac{1}{2}[\|\ell(X)\|^2] \quad (1)$$

where the residual factor is defined as:

$$\ell(X) = \begin{bmatrix} S_1(X) - m_1 \\ S_2(X) - m_2 \\ \vdots \\ S_j(X) - m_j \\ \vdots \\ S_m(X) - m_M \end{bmatrix} \quad (2)$$

where $S_j(X)$ is the modeled tool response corresponding to a particular value of pipe attribute vector X. For a single pipe scenario, X=[OD; h; $\sigma$; $\mu$]. If pipe OD and pipe material are known or predetermined, X is simply equal to pipe thickness h, $m_j$ is the corresponding measured data, and $\|.\|$ refers to the L2-norm. If the EM logging tool 100 is operated as a time-domain tool, measured data $m_j$ are usually selected time bins that may correspond to different pipe diameters. On the other hand, if the EM logging tool 100 is operated at a frequency or multiple frequencies, measured data $m_j$ are collected signals at the frequency or frequencies used. If multiple sensor arrays 202 are employed in the EM logging tool 100, measured data $m_j$ are tool responses (frequency or time-domain) from all of the selected arrays.

However, as previously mentioned, the presence of pipe couplings 304 (e.g., shown on FIG. 3) complicates the inversion process for multiple concentric pipes 300, leading to the potential for inaccurate results, including, but not limited to, errors in thickness estimations. To illustrate the effects of pipe couplings 304 simulated results are provided for a corrosion detection tool 100 with a transmitter 102 and six of the receivers 104, as shown on FIG. 2. The corrosion detection tool 100 is used to log a concentric multi-string arrangement with five concentric pipes. Table 1 below shows the parameters of the pipe segments 302 and pipe couplings 304.

TABLE 1

| Pipe No. | Outer Diameter | Thickness | Collar Periodicity | Collar offsets from the edge | Collar Length | Collar Outer Diameter |
|---|---|---|---|---|---|---|
| Pipe 1 | 2⅞ in (7 cm) | 0.217 in (0.6 cm) | 42 ft (13 m) | 20 ft (6 m) | 7 in (18 cm) | 3.875 in (10 cm) |
| Pipe 2 | 7 in (18 cm) | 0.324 in (0.8 cm) | 45 ft (14 m) | 22 ft (7 m) | 9 in (23 cm) | 7.656 in (19 cm) |
| Pipe 3 | 9⅝ in (24 cm) | 0.545 in (1.4 cm) | 40 ft (12 m) | 25 ft (8 m) | 10.5 in (27 cm) | 10.625 in (27 cm) |
| Pipe 4 | 13⅜ in (34 cm) | 0.514 in (1.3 cm) | 35 ft (11 m) | 30 ft (9 m) | 10.5 in (27 cm) | 14.375 in (37 cm) |
| Pipe 5 | 18⅝ in (47 cm) | 0.435 in (1.1 cm) | 32 ft (10 m) | 27 ft (8 m) | 11 in (28 cm) | 20 in (51 cm) |

The thickness of the five concentric pipes was estimated using a 1D radial inversion to process the EM log data of the corrosion detection tool 100. In the 1D radial inversion, the responses of the receivers 104 are aligned at any certain depths and then an optimization is solved to find the individual thicknesses of the pipes at that depth. The forward model used is a 1 D model that only allows considering variations of thicknesses in the radial direction while the thicknesses of the pipes along the longitudinal (depth) and azimuthal directions are assumed to be constant and equal to the values at the current depth. This inversion process is repeated at each depth until the thickness variations are estimated along the depth.

Figure 4:
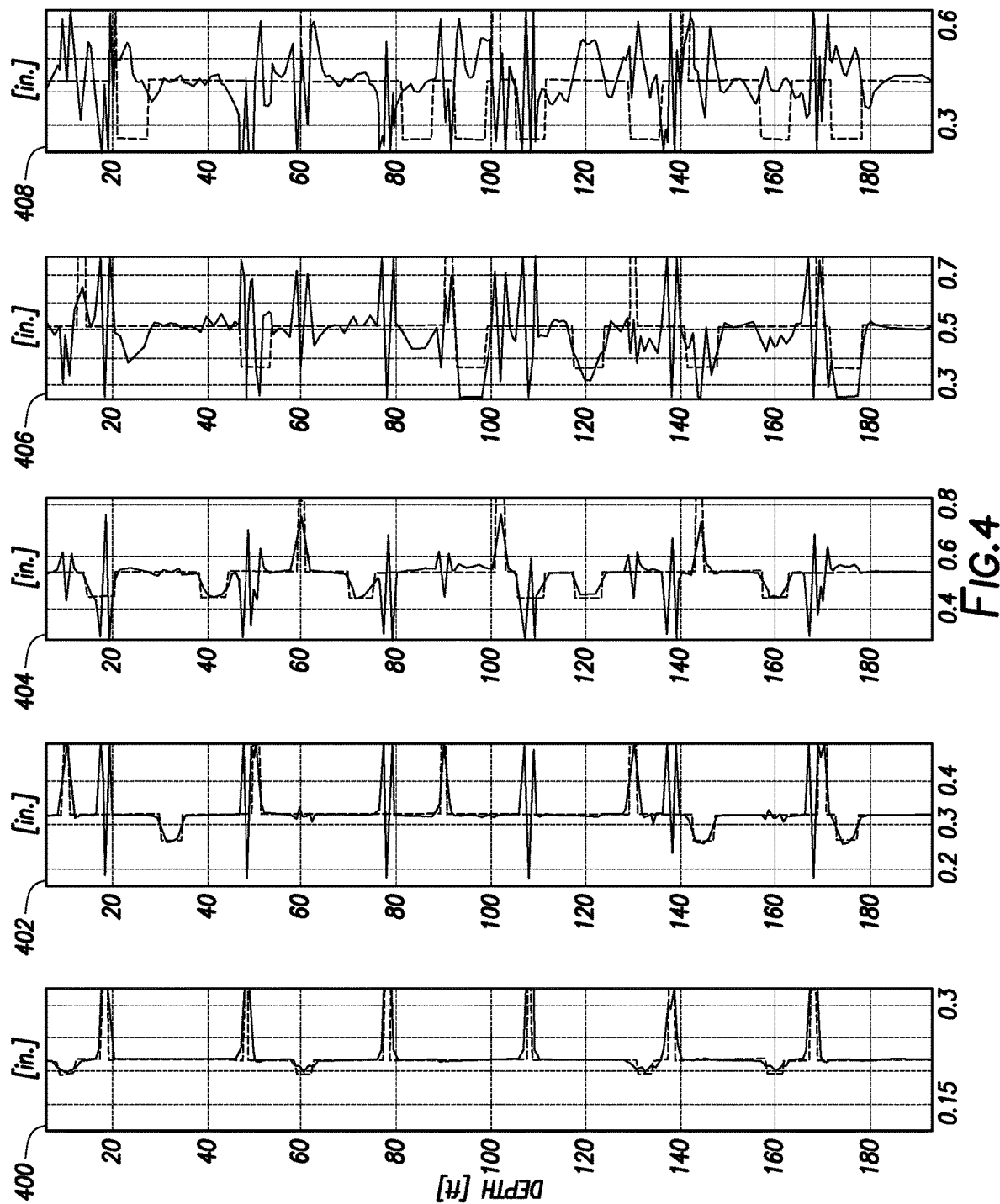
FIG. 4 is an example of a thickness log.

FIG. 4 is a thickness log showing the thickness estimations of the five concentric pipes from the 1D radial inversion. The individual logs for each of the concentric pipes are shown on FIG. 4 as first pipe log 400, second pipe log 402, third pipe log 404, fourth pipe log 406, and fifth pipe log 408, wherein first pipe log 400 is for the innermost pipe and fifth pipe log 408 is for the outermost pipe. From FIG. 4, it is observed that the thickness estimations suffer large errors due to the presence of pipe couplings 304. The errors may be because the inversion process is employing a 1D forward model in which at each depth the thickness values are assumed to be constant along the depth. This assumption expedites the inversion process since the forward model needs to be solved hundreds of times and using a faster and simpler model helps implementing the whole process faster. However, this 1D model cannot accurately model components such as pipe couplings 304 (e.g., shown on FIG. 3) due to their short length (about 1 ft (0.3 m)) along the depth. Accordingly, there are large variations in the thickness estimations shown on FIG. 4, especially for the outer pipes.

For a given well, various properties of the pipe couplings 304 (e.g., shown on FIG. 3) may be known or can be determined, including location, dimensions, and electrical properties (e.g., conductivity, magnetic permeability). These coupling properties may be employed to improve the accuracy of the determination of pipe attributes in characterization of multi-pipe configurations. Any suitable technique may be used to identify the coupling properties. For example, the coupling properties may be known for a particular well. Alternatively, one or more of the pipe properties may be determined, including location, dimensions, and electrical properties.

Methods may be employed to determine the location of pipe couplings 304 in concentric multi-pipe arrangements. These methods may be employed for both frequency-domain and time-domain arrangements. In one case, the length of the pipe segments 302 may be know because they were procured and placed there so that the position of the pipe couplings 304 may be determined in the EM log data, for example, due identification of coupling signals. Alternatively, length of the pipe segments 302 may not be known so that location of pipe couplings 304 may need to be identified in the well log data. When the lengths of the joints are not known, it may assumed that pipe couplings 304 may be approximately periodic along the length of a well, and in a spatial Fourier transform of the signal recorded by the receivers 104 of a typical eddy current device (frequency domain or time domain), the periodicity may produce a significant component at a spatial frequency corresponding to the period of the pipe couplings 304 even if visually, the coupling signature may not be easily identifiable. The typical signal that a pipe coupling 304 generates in a corrosion detection tool 100 may be approximately known a priori, because the geometry of the pipe coupling 304 may be approximately known. Physical properties of the pipe, such as electrical conductivity may also be known if the type of steel used is known, but typically, the magnetic permeability is not known. The typical signal of the pipe coupling 304 may be simulated for a small number of cases corresponding to a few values of electrical conductivity and a few values of magnetic permeability. Once the positions of the pipe couplings 304 in the different concentric pipes 300 are found, the signature of the pipe couplings 304, evaluated from simulations or obtained from the logs, can be used to approximately subtract that signature in the frequency domain from the Fourier transform of the log prior.

Methods may also be employed to determine electrical properties of pipe couplings 304. Any suitable technique may be employed to determine electrical properties of pipe couplings 304. Electrical conductivity may be known, for example, if the type of steel used is known, but typically, the magnetic permeability is not known. An inversion process may be implemented at the position of the pipe couplings for estimating electrical properties of pipe couplings 304.

As previously mentioned, coupling properties may be employed to improve the accuracy of the determination of pipe attributes in characterization of multi-pipe configurations. The coupling properties used may include, but are not limited to, position, dimension, and electrical properties. A number of different techniques may be employed to account for the coupling properties, which will each be described in more detail in the following sections. These techniques may include, but are not limited to, subtracting thickness estimations of the pipe couplings 304 from estimated thicknesses of the pipes, subtracting collar responses from overall responses of the EM logging tool 100, or applying constraints or regularization terms in the inversion processing using, for example, prior information regarding coupling properties. For these techniques, it is assumed that the positions of the pipe couplings 304 are already known (e.g., estimated).

One method to account for coupling properties includes of the coupling properties in the forward model. A forward model may be used in the inversion to determine estimated thicknesses from receiver response. One or more of the coupling properties, including location, dimensions, and/or electrical properties, may be used in the forward model. If partial information about the coupling properties is included in the forward model, the rest of the coupling properties may be estimated in the inversion. If 1D radial inversion (variations are allowed only along the radial direction) is used, however, even including complete information about coupling properties may not lead to satisfactory thickness estimations, for example, due to the limited length of the pipe couplings 304 (e.g., about 1 ft (0.3 m)). However, a 2D model (variations are allowed along the radial and longitudinal directions), more accurate inversion results may be obtained when using coupling properties in the forward modeling. The 2D models allow for taking into account the finite length of the pipe couplings 304 along the depth but they are typically much slower than 1D models and can lead to slower inversion process.

Another method to account for coupling properties may be to subtract the responses of the pipe couplings 304 (e.g., shown on FIG. 3) from the overall responses of the receivers 104 (e.g., shown on FIG. 2). The responses of the pipe couplings 304 may be obtained by any suitable technique, including, but not limited to, measurement or simulation. Once the response of the pipe couplings 304 is obtained, they can be subtracted from the responses obtained for the multiple concentric pipes 300, including both couplings and defects. This reduces the effect of the pipe couplings 304 on the responses and thus the inversion results only show variations of the thickness due to the defects. To perform the inversion on the subtracted responses, the cost function in the inversion algorithm can be modified to operate based on the differential responses (responses of the defected sections minus responses of the non-defected sections). Alternatively, the responses at nominal section (non-defected section) can be added to the subtracted responses obtained above and the cost function in the inversion algorithm does not need to be changed.

Figure 5:
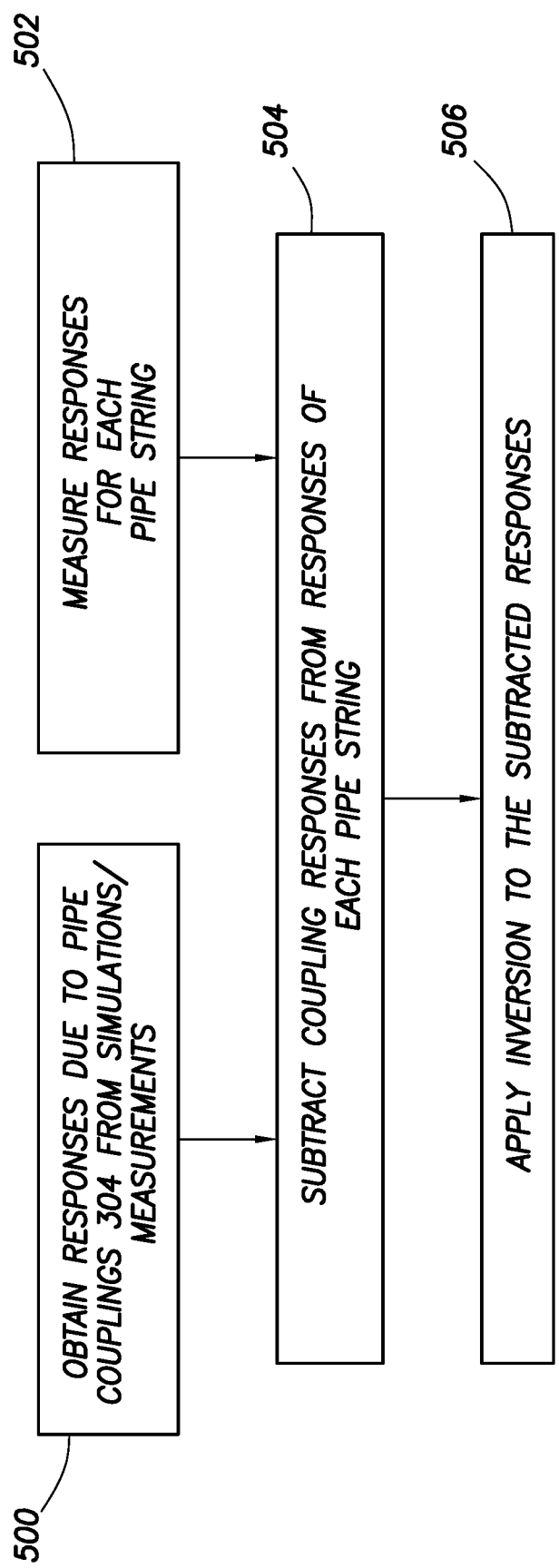
FIG. 5 is an example of a flow chart of a method for reducing the effect of pipe couplings.

Referring now to FIG. 5, a flow chart is shown of an example method to account for coupling properties that includes subtracting the responses of the pipe couplings 304 (e.g., shown on FIG. 3). At block 500, the method may include obtaining response due to pipe couplings 304 from simulations/measurements. The response due to pipe couplings 304 may be obtained for each pipe of a concentric multi-string arrangement (e.g., inner pipe 108 and outer pipe 110 of concentric pipes 300 shown on FIG. 3). To obtain coupling responses via simulation, the same pipes configuration may be simulated while putting pipe couplings 304 with known dimensions and electrical properties on the pipes one at a time to get coupling responses from each pipe. Alternatively, the pipe couplings 304 for all the pipes can be placed in the synthetic model by knowing their positions, dimensions, and properties a priori. These parameters can be also fully or partially obtained from application of a first round of inversion process on the measured data. The coupling responses may also be obtained from measurements. This can be achieved by measuring the responses of pipe couplings 304 of individual pipes (e.g., inner pipe 108 and outer pipe 110 shown on FIG. 3) separately from knowing their positions. Collars responses are then subtracted from responses of sections with similar size that include defects as well. At block 502, the method may measure response for each pipe. The measurement may include responses of defects and pipe couplings 304. At block 504, the method may include subtracting coupling responses from responses of each pipe section. This may reduce, and possibly eliminate coupling responses from the EM log data. At block 506, the method may include applying inversion to the subtracted responses from block 504. The inversion may be applied directly to the subtracted responses, for example, with a modified inversion, for example, including a modified cost function that operates based on the differential responses (responses of the defected sections minus responses of the non-defected sections). Alternatively, applying inversion to the subtracted response may include, first, adding the responses at the nominal section (non-defected section) to the subtracted responses from block 504 and then applying the inversion, wherein the cost function in the inversion algorithm does not need to be changed.

Figure 6:
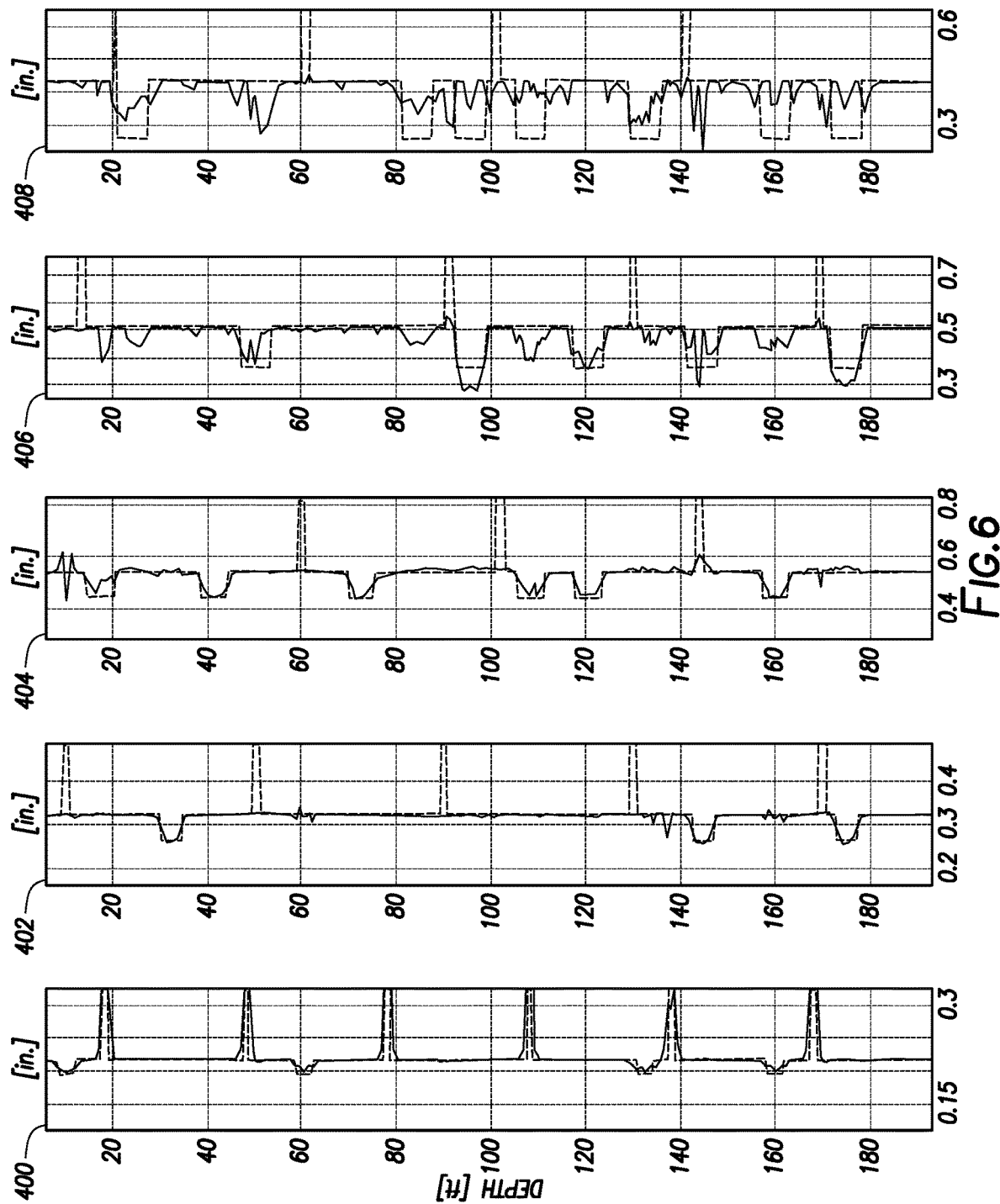
FIG. 6 is an example of another thickness log.

FIG. 6 is a thickness log showing the results of applying the method shown on FIG. 5 to thickness estimation of the five concentric pipes. The individual logs for each of the concentric pipes are shown on FIG. 6 as first pipe log 400, second pipe log 402, third pipe log 404, fourth pipe log 406, and fifth pipe log 408, wherein first pipe log 400 is for the innermost pipe and fifth pipe log 408 is for the outermost pipe. The five concentric pipes had the parameters provided above in Table 1. As can be observed by comparing FIG. 6 to FIG. 4, which did not account for coupling properties, the results of the inversion may be improved significantly.

Yet another method to account for coupling properties after inversion, for example, by subtracting thickness estimation due to pipe couplings 304 (e.g., shown on FIG. 3) without defects from thickness estimations due to pipe couplings 304 and defects. Thickness estimations for the pipe couplings 304 may be acquired for the same pipe configuration including pipe couplings 304 but without the defects. Then, these estimated thicknesses may be subtracted from the inversion results for each pipe section that includes defects. This approach requires the knowledge of the positions of the pipe couplings 304 which can be obtained by obtained as described above. The responses of the pipe couplings 304 can be obtained via simulations or measurements.

Figure 7:
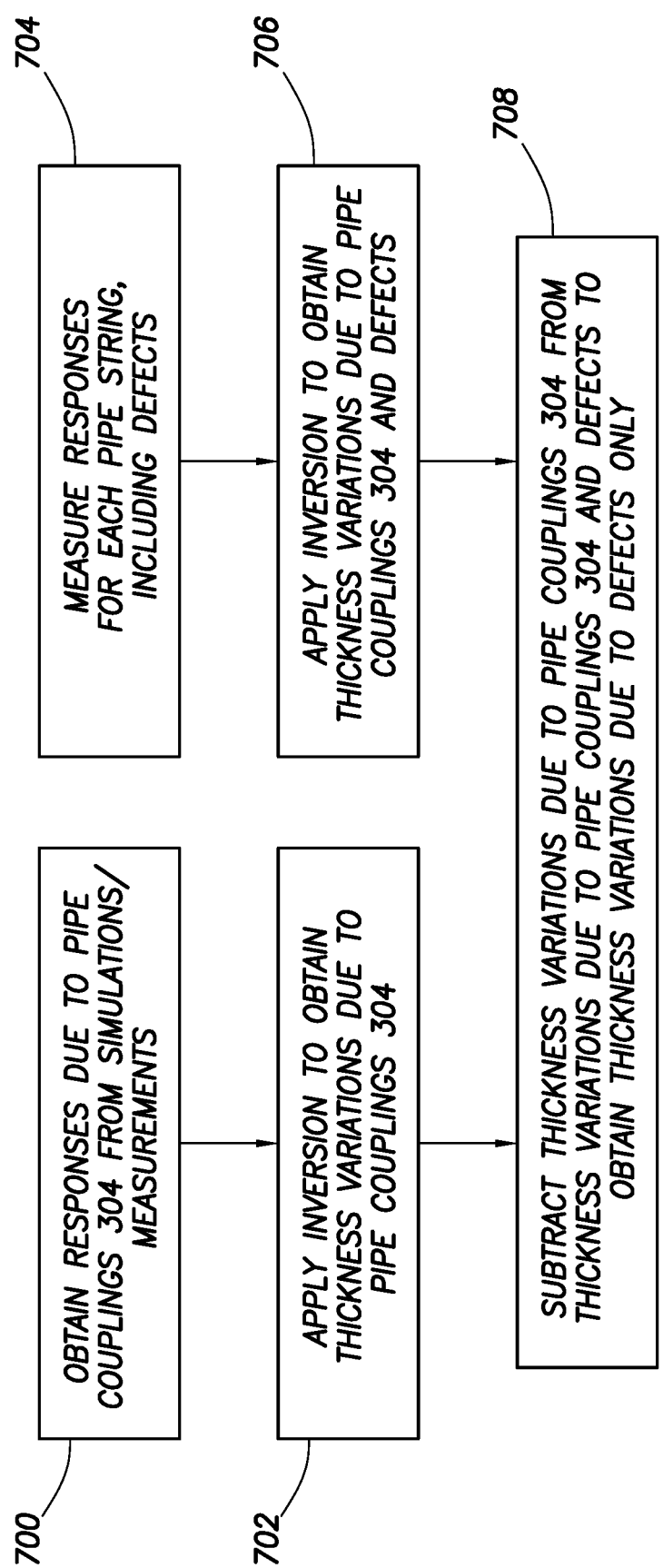
FIG. 7 is an example of a flow chart of another method for reducing the effect of pipe couplings.

Referring now to FIG. 7, a flow chart is shown of an example method to account for coupling properties that includes subtracting the thickness estimations for the pipe couplings 304 (e.g., shown on FIG. 3). At block 700, the method may include obtaining response due to pipe couplings 304 from simulations/measurements. The response due to pipe couplings 304 may be obtained for each pipe of a concentric multi-string arrangement (e.g., inner pipe 108 and outer pipe 110 of concentric pipes 300 shown on FIG. 3). The response due to pipe couplings 304 may be obtained without defects. A simulation model may be employed to generate responses of the receivers 104 (e.g., shown on FIG. 2) for sections of the pipes that include pipe couplings 304, but do not include defects. Alternatively, sections of the pipes may be measured that include pipe couplings 304 but do not include defects. At block 702, the method may include applying inversion to obtain thickness variations due to pipe couplings 304. The inversion may be applied to the response due to the pipe couplings from block 702. At block 704, the method may measure responses for each pipe that includes defects and pipe couplings 304. At block 706, inversion may be applied to obtain thickness variations due to pipe couplings 304 and defects. At block 708, the method may include subtracting the thickness variations due to pipe couplings 304 from the thickness variations due to pipe couplings 304 and defects so that thickness variations due to defects only may be obtained.

Figure 8:
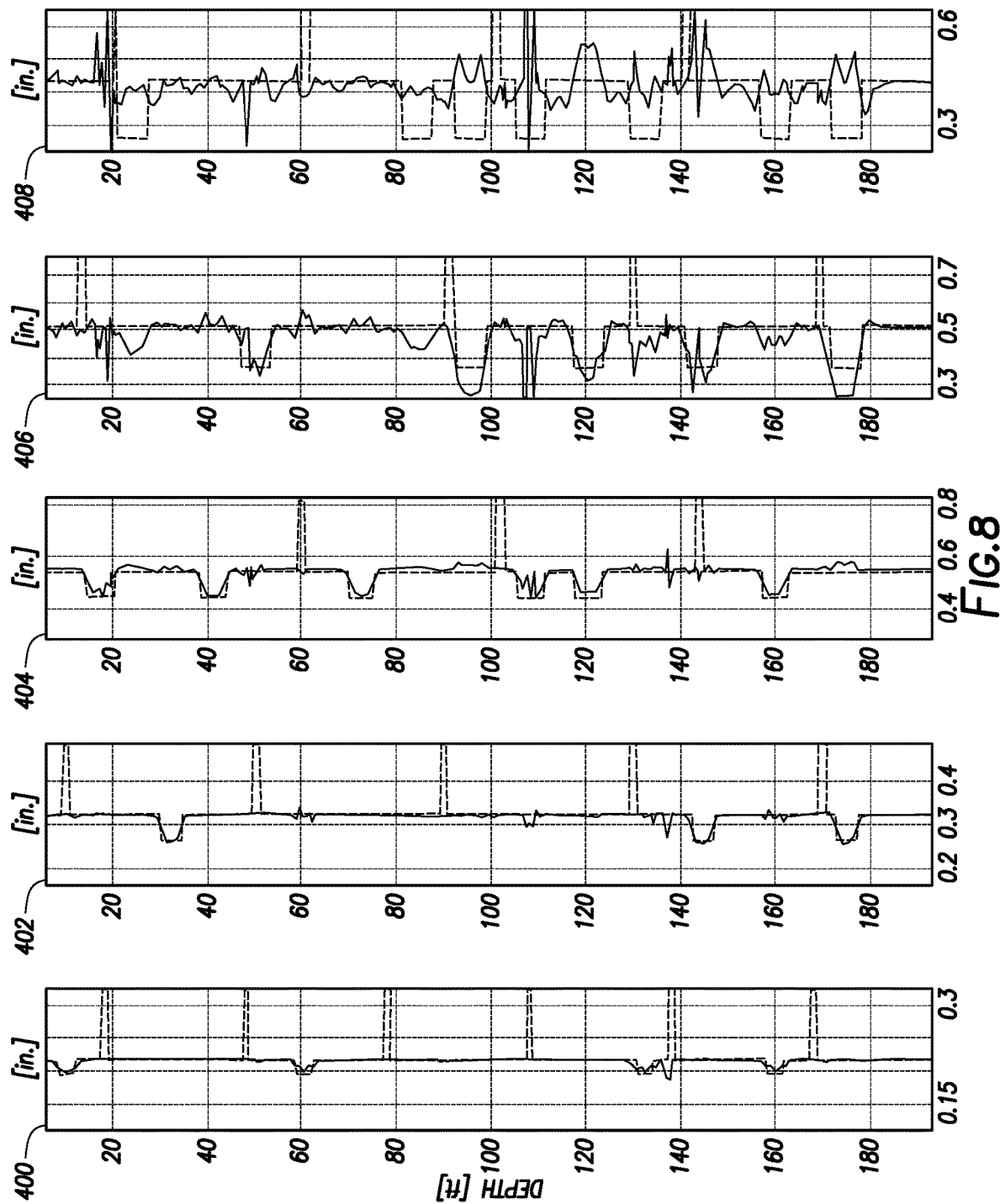
FIG. 8 is an example of another thickness log.

FIG. 8 is a thickness log showing the results of applying the method shown on FIG. 7 to thickness estimation of the five concentric pipes. The individual logs for each of the concentric pipes are shown on FIG. 7 as first pipe log 400, second pipe log 402, third pipe log 404, fourth pipe log 406, and fifth pipe log 408, wherein first pipe log 400 is for the innermost pipe and fifth pipe log 408 is for the outermost pipe. The five concentric pipes had the parameters provided above in Table 1. As can be observed by comparing FIG. 8 to FIG. 4, which did not account for coupling properties, the results of the inversion may be improved significantly.

Yet another method to account for coupling properties may include application of constraints in the inversion process. Application of constraints may include applying non-positive thickness variations constraints along each pipe during the inversion except at the positions of pipe couplings 304. For example, this can be implemented as:

$$(z)T(z) \leq Ti(z) \leq 0 \text{ for } i=1, \ldots, Np, \text{ and } z \in zip \quad (3)$$

$$\alpha i(z)Ti(z) \leq Ti(z) \leq \beta i(z)Ti(z) \text{ for and } z \in zic \quad (4)$$

where Ti(z) and Ti(z) are the nominal thickness and optimizable thickness parameters, respectively, along the depth z, Np is the number of pipes, zic and zip are depth values corresponding to sections of the i-th pipe with and without pipe couplings 304, respectively, αi(z) is a positive real number between 0 and 1 and βi(z) is a positive real number larger than 1.

Alternatively, the non-positive thickness variations constraints can be implemented as:

$$(z)-Ti(z) \leq Ti(z) \leq 0 \text{ for } i=1, \ldots, Np, \text{ and } z \in zip \quad (5)$$

$$Ti(z)-Tid(z) \leq Ti(z) \leq Ti(z')+Tic(z) \text{ for } i=1, \ldots, Np, \text{ and } z \in zic \quad (6)$$

where Tid(z) and Tic(z) are real and positive numbers allowing thickness variations from the nominal thickness for the i-th pipe for the defected sections and couplings, respectively.

FIG. 9 is a thickness log showing the thickness estimation results for the same example as in FIG. 4, with parameters from Table 1, but when allowing positive thickness variations only at the positions of the pipe couplings 304. It is observed that significant improvement is achieved by knowing the positions of the couplings and by applying such constraints, spurious positive thickness variations are eliminated. The individual logs for each of the concentric pipes are shown on FIG. 9 as first pipe log 400, second pipe log 402, third pipe log 404, fourth pipe log 406, and fifth pipe log 408, wherein first pipe log 400 is for the innermost pipe and fifth pipe log 408 is for the outermost pipe. As can be observed by comparing FIG. 9 to FIG. 4, which did not account for coupling properties, the results of the inversion may be improved significantly, for example, when constraints are applied in the inversion.

In addition, a high pass filter may be used to remove the thickness baseline of raw responses, wherein the constraint can be based on deviations, instead of nominal. Accordingly, cases may be processed where baseline is shifting. This leads to a constraint as shown below instead of (3):

$$(z)T(z) \le \Delta Ti(z) \le 0 \text{ for } i=1, \ldots, Np, \text{ and } z \in zip \quad (7)$$

where $yi(z)$ is a positive real number between 0 and 1.

Yet another way to take into account for coupling properties in the inversion may be to apply proper regularization terms to the cost function. A regulation term may be applied to the cost function such that it forces the thickness values at positions other than the coupling positions to be as close as possible to the nominal thickness of the pipes $T(z)$ while the thickness values at coupling positions are forced to be as close as possible to the thickness of the pipes plus some possible thickness values for couplings $Tic(z)$, e.g., $Ti(z)+Tic(z)$:

$$\begin{cases} \tilde{J} = J + \gamma_{ip} \left\| \frac{\overline{T}_i(z)}{T_i(z)} - 1 \right\| & \text{for } i = 1, \ldots, Np, \text{ and } z \in z_p \\ \tilde{J} = J + \gamma_{ic} \left\| \frac{\overline{T}_i(z)}{T_i(z) + T_{ic}(z)} - 1 \right\| & \text{for } i = 1, \ldots, Np, \text{ and } z \in z_c \end{cases} \quad (8)$$

where $\tilde{J}$ and J are the modified and old cost functions, respectively, and yic and yip are the regularization constants used for the i-th pipe at depths with and without pipe couplings 304, respectively.

Possible values for the thickness of the couplings if the values are not given for the test well can be obtained from American Petroleum Institute (API) standard tables.

Yet another method to take into account for coupling properties in the inversion may be to account for the sharp spikes in the thickness estimations, as observed in FIG. 4, at the coupling positions of other pipes. More specifically, with reference to FIG. 4, the pipe couplings 304 (e.g., FIG. 3) of the inner pipes appear as spurious sharp spikes in the thickness estimations of the outer pipes, for example, on second pipe log 402, third pipe log 404, and fourth pipe log 406. One technique to account for these spurious sharp spikes may be eliminate any deviations from nominal for the outer pipes (e.g., outer pipe 110 shown on FIG. 3) at the positions of the pipe couplings 304 of inner pipes (e.g., inner pipe 108 shown on FIG. 3). This may be done on the thickness estimations after inversion. A drawback may be that it does not allow for defect thickness estimation on outer pipes at the position of pipe couplings 304 (e.g., shown on FIG. 3) on inner pipes. Another technique to account for these spurious sharp spikes may be to characterize defects on the outer pipes (e.g., outer pipe 110 shown on FIG. 3) at the positions of the pipe couplings 304 (e.g., shown on FIG. 3) may be to use the previously discussed regularization term in the cost function. For example, a regularization term may be added to the cost function such that values of thickness for the outer pipes at coupling positions on inner pipes (e.g., inner pipe 108 on FIG. 3) can be forced to be as close as possible to the nominal thickness of the pipes. If similar regularization terms are used for other positions, the regularization constant can be chosen such that the regularization would be stronger at the coupling positions.

Yet another method to take into account for coupling properties may be to remove coupling responses completely from the thickness estimations. The interval beyond which the coupling response may be negligible, e.g., below a pre-determined threshold, may be detected. The response within this interval due to the pipe coupling 304 (e.g., shown on FIG. 3) may be removed by interpolating between the start and end points for this interval, thus making the pipe coupling disappear from the thickness estimation.

Using one or more of the previously described techniques, coupling locations may be identified at each depth and accounted for by applying proper constraints when inspecting multiple concentric pipes 300 e.g., shown on FIG. 3. The effect of pipe couplings 304 (e.g., shown on FIG. 3) may produce spurious results on thickness estimations for other pipes, which needs to be accounted for. Accordingly, when a pipe coupling 304 is detected at current depth, proper constraints and operations may be applied for the same, but also implements for other pipes. For example, where a pipe coupling 304 is detected on the pipe (e.g., inner pipe 108 shown on FIG. 3) at the current depth certain constraints may be applied to that pipe, including, but not limited to, allowing thickness larger than nominal or subtraction of the collar response. The effect of the pipe coupling 304 may also be accounted for on the other pipes (e.g., outer pipe 110), including, but not limited to subtraction of the collar response. Alternatively, the effect of the pipe coupling 304 may not be addressed on the other pipes. Where the pipe coupling 304 is not detected at depth, thickness of the pipe may be constrained to smaller (or slightly larger) than nominal. No action may be taken with respect to the other pipes.

Accordingly, this disclosure describes systems and methods for reducing effects of pipe couplings 304 (e.g., shown on FIG. 3) in EM log data. The systems and methods may use information about location of pipe couplings 304 to improve the quality of the inversion results. Several embodiments disclosed may reduce the effect of the presence of pipe couplings 304 either from the tool response or from the estimated thickness results. The proposed embodiments can reduce the complexity that arises due to the presence of pipe couplings 304 in particular for multi-pipe configurations where the large number of pipe couplings 304 produces a lot of variations in the measured responses and also in the thickness estimations. The systems and methods may include any of the following statements:

Accordingly, systems and methods are provided for reducing effects of pipe couplings in EM log data. The systems and methods may include any of the various features of the systems and methods disclosed herein, including one or more of the following statements.

Statement 1: A method for corrosion detection comprising: disposing an electromagnetic logging tool within a plurality of concentric pipes in a wellbore; obtaining electromagnetic log data along the concentric pipes; and identifying a location of at least one pipe coupling on at least one of the concentric pipes; and processing the electromagnetic log data to determine one or more attribute of the concentric pipes as a function of depth, wherein the processing uses the location of at least one pipe coupling to account for effect of the at least one pipe coupling on the electromagnetic log data.

Statement 2: The method of Statement 1, wherein the electromagnetic log data comprises responses of the electromagnetic logging tool, the responses comprising pipe responses and coupling responses.

Statement 3: The method of Statement 1 or Statement 2, wherein the processing the electromagnetic log data comprises identifying intervals of the at least one of the concentric pipes beyond which responses of the pipe couplings are below a threshold, obtaining the one or more attributes from a process comprising inversion, and interpolating the one or more attributes between a start point and an endpoint of the intervals.

Statement 4: The method of any preceding statement, wherein the processing the electromagnetic log data comprises applying an inversion to the electromagnetic log data to obtain the one or more attributes, and removing deviations from nominal in the one or more attributes for an outermost of the concentric pipes at the location of the at least one pipe coupling.

Statement 5: The method of any preceding statement, wherein the processing comprises an inversion comprising iteratively solving a cost function, wherein one or more regulation terms are applied in the inversion to force thickness values of the concentric pipes to be within a threshold of nominal at positions other than the locations of the pipe couplings while the thickness values at the location of the at least one pipe coupling is forced to be within a threshold of the one or more attributes plus a coupling thickness value.

Statement 6: The method of any preceding statement, wherein the processing comprises an inversion comprising iteratively solving a cost function, wherein one or more constraints are applied in the inversion, wherein the one or more constraints comprises a non-positive thickness variation along each of the concentric pipes except at the location of the at least one pipe coupling.

Statement 7: The method of any preceding statement, wherein the one or more attributes comprises pipe thickness, wherein the processing comprises subtracting thickness variations due to the pipe couplings without defects from thickness variations for each of the concentric pipes with the pipe couplings and the defects.

Statement 8: The method of Statement 7, wherein the obtaining electromagnetic log data comprises measuring responses of one or more receivers on the electromagnetic logging tool to obtain measured responses for each of the concentric pipes, and obtaining response due to the pipe couplings without defects from simulation or measurement, and wherein the processing further comprises applying inversion to the response due to the pipe couplings to obtain the thickness variations due to the pipe couplings without the defects and apply inversion to the measured responses to obtain the thickness variations for each of the concentric pipes.

Statement 9: The method of any preceding statement, wherein the processing comprises subtracting responses due to the pipe couplings from measured responses for each of the concentric pipes to obtain a subtracted response; and applying inversion to the subtracted response to obtain the one or more attributes, wherein the one or more attributes comprises pipe thickness.

Statement 10: The method of Statement 9, wherein the obtaining electromagnetic log data comprises measuring responses of one or more receivers on the electromagnetic logging tool to obtain the measured responses for each of the concentric pipes, and obtaining the response due to the pipe couplings from simulation or measurement.

Statement 11: The method of any preceding statement, wherein the one or more attributes comprises at least one pipe attribute selected from the group consisting of pipe thickness, pipe conductivity, pipe permeability, and combinations thereof.

Statement 12: The method of any preceding statement, wherein the obtaining electromagnetic log data comprises transmitting a primary magnetic field from a transmitter of the electromagnetic logging tool such that Eddy currents are produced in the concentric pipes that in turn produce secondary magnetic fields, and sensing the secondary magnetic fields with one or more receivers on the electromagnetic logging tool.

Statement 13: A corrosion monitoring system comprising: an electromagnetic logging tool to collect electromagnetic log data along a plurality of concentric pipes in a wellbore; and a processing unit in communication with the electromagnetic logging tool, wherein the processing unit is operable to process the electromagnetic log data to determine one or more attribute of the concentric pipes as a function of depth, wherein the processing uses a location of at least one pipe coupling to account for effect of the at least one pipe coupling on the electromagnetic log data.

Statement 14: The system of Statement 13, wherein the electromagnetic logging tool comprises a transmitter and a receiver.

Statement 15: The system of Statement 13 or Statement 14, wherein the transmitter and receiver each individually comprise at least one device selected from a group consisting of a coil, a wire antenna, a toroidal antenna, an azimuthal button electrode, and combinations thereof.

Statement 16: The system of any one of Statements 13 to 15, wherein the electromagnetic logging tool comprises a tool body, a transmitter coupled the tool body, receivers coupled the tool body, wherein the receivers are axial spaced from the transmitter.

Statement 17: The system of any one of Statements 13 to 16, wherein the processing unit is further operable to identify intervals of the at least one of the concentric pipes beyond which responses of the pipe couplings are below a threshold, obtain the one or more attributes from a process comprising inversion, and interpolate the one or more attributes between a start point and an endpoint of the intervals.

Statement 18: The system of any one of Statements 13 to 17, wherein the processing unit is further operable to apply an inversion to the electromagnetic log data to obtain the one or more attributes, and remove deviations from nominal in the one or more attributes for an outermost of the concentric pipes at the location of the at least one pipe coupling.

Statement 19: The system of any one of Statements 13 to 18, wherein the processing unit is further operable to apply an inversion to iteratively solve a cost function, wherein one or more regulation terms are applied in the inversion to force thickness values of the concentric pipes to be within a threshold of nominal at positions other than the location of the at least one pipe coupling while the thickness values at the locations of the pipe couplings are forced to be within a threshold of the one or more attributes plus a coupling thickness value.

Statement 20: The system of any one of Statements 13 to 19, wherein the processing unit is further apply to apply an inversion comprising iteratively solving a cost function, wherein one or more constraints are applied in the inversion, wherein the one or more constraints comprises a non-positive thickness variation along each of the concentric pipes except at the location of the at least one pipe coupling.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for corrosion detection comprising:
    disposing an electromagnetic logging tool within a plurality of concentric pipes in a wellbore;
    obtaining electromagnetic log data along the plurality of concentric pipes that include an inner pipe and one or more outer pipes; and
    identifying a location of at least one pipe coupling on at least one of the plurality of concentric pipes; and
    processing the electromagnetic log data to determine one or more attributes of the plurality of concentric pipes as a function of depth, wherein the one or more attributes comprises pipe thickness, wherein the processing uses the location of at least one pipe coupling on the inner pipe to account for effect of the at least one pipe coupling on the one or more outer pipes, and wherein the processing comprises subtracting thickness variations due to the at least one pipe coupling without defects from thickness variations for each of the plurality of concentric pipes with the at least one pipe coupling and the defects.

2. The method of claim 1, wherein the electromagnetic log data comprises responses of the electromagnetic logging tool, the responses comprising pipe responses of the electromagnetic logging tool and coupling responses of the electromagnetic logging tool.

3. The method of claim 1, wherein the processing the electromagnetic log data comprises identifying intervals of the at least one of the plurality of concentric pipes beyond which responses of one or more pipe couplings are below a threshold, obtaining the one or more attributes from a process comprising inversion, and interpolating the one or more attributes between a start point and an endpoint of the intervals.

4. The method of claim 1, wherein the processing the electromagnetic log data comprises applying an inversion to the electromagnetic log data to obtain the one or more attributes, and removing deviations from nominal in the one or more attributes for an outermost of the plurality of concentric pipes at the location of the at least one pipe coupling.

5. The method of claim 1, wherein the processing comprises an inversion comprising iteratively solving a cost function, wherein one or more regulation terms are applied in the inversion to force thickness values of the plurality of concentric pipes to be within a threshold of nominal at positions other than the location of at least one pipe coupling while the thickness values at the location of the at least one pipe coupling is forced to be within a threshold of the one or more attributes plus a coupling thickness value.

6. The method of claim 1, wherein the processing comprises an inversion comprising iteratively solving a cost function, wherein one or more constraints are applied in the inversion, wherein the one or more constraints comprises a non-positive thickness variation along each of the plurality of concentric pipes except at the location of the at least one pipe coupling.

7. The method of claim 1, wherein the obtaining electromagnetic log data comprises measuring responses of one or more receivers on the electromagnetic logging tool to obtain measured responses for each of the plurality of concentric pipes, and obtaining response due to the pipe couplings without defects from simulation or measurement, and wherein the processing further comprises applying inversion to the response due to the pipe couplings to obtain the thickness variations due to the pipe couplings without the defects and apply inversion to the measured responses to obtain the thickness variations for each of the plurality of concentric pipes.

8. The method of claim 1, wherein the obtaining electromagnetic log data comprises measuring responses of one or more receivers on the electromagnetic logging tool to obtain the measured responses for each of the plurality of concentric pipes, and obtaining the measured response due to the at least one pipe coupling from simulation or measurement.

9. The method of claim 1, wherein the one or more attributes comprises at least one pipe attribute selected from the group consisting of pipe thickness, pipe conductivity, pipe permeability, and combinations thereof.

10. The method of claim 1, wherein the obtaining electromagnetic log data comprises transmitting a primary magnetic field from a transmitter of the electromagnetic logging tool such that Eddy currents are produced in the plurality of concentric pipes that in turn produce secondary magnetic fields, and sensing the secondary magnetic fields with one or more receivers on the electromagnetic logging tool.

11. A corrosion monitoring system comprising:
an electromagnetic logging tool to collect electromagnetic log data along a plurality of concentric pipes that include an inner pipe and one or more outer pipes in a wellbore; and
a processing unit in communication with the electromagnetic logging tool, wherein the processing unit is operable to process the electromagnetic log data to determine one or more attributes of the plurality of concentric pipes as a function of depth, wherein the one or more attributes comprises pipe thickness, wherein the processing uses a location of at least one pipe coupling on the inner pipe to account for effect of the at least one pipe coupling on the one or more outer pipes, and wherein the processing comprises subtracting thickness variations due to the at least one pipe coupling without defects from thickness variations for each of the plurality of concentric pipes with the at least one pipe coupling and the defects.

12. The corrosion monitoring system of claim 11, wherein the electromagnetic logging tool comprises a transmitter and a receiver.

13. The corrosion monitoring system of claim 11, wherein a transmitter and a receiver each individually comprise at least one device selected from a group consisting of a coil, a wire antenna, a toroidal antenna, an azimuthal button electrode, and combinations thereof.

14. The corrosion monitoring system of claim 11, wherein the electromagnetic logging tool comprises a tool body, a transmitter coupled the tool body, receivers coupled the tool body, wherein the receivers are axial spaced from the transmitter.

15. The corrosion monitoring system of claim 11, wherein the processing unit is further operable to identify intervals of the at least one of the plurality of concentric pipes beyond which responses of the at least one pipe coupling are below a threshold, obtain the one or more attributes from a process comprising inversion, and interpolate the one or more attributes between a start point and an endpoint of the intervals.

16. The corrosion monitoring system of claim 11, wherein the processing unit is further operable to apply an inversion to the electromagnetic log data to obtain the one or more attributes, and remove deviations from nominal in the one or more attributes for an outermost of the plurality of concentric pipes at the location of the at least one pipe coupling.

17. The corrosion monitoring system of claim 11, wherein the processing unit is further operable to apply an inversion to iteratively solve a cost function, wherein one or more regulation terms are applied in the inversion to force thickness values of the plurality of concentric pipes to be within a threshold of nominal at positions other than a location of the at least one pipe coupling while the thickness values at the location of the at least one pipe coupling are forced to be within a threshold of the one or more attributes plus a coupling thickness value.

18. The corrosion monitoring system of claim 11, wherein the processing unit is further apply to apply an inversion comprising iteratively solving a cost function, wherein one or more constraints are applied in the inversion, wherein the one or more constraints comprises a non-positive thickness variation along each of the plurality of concentric pipes except at the location of the at least one pipe coupling.

19. A method for corrosion detection comprising:
disposing an electromagnetic logging tool within a plurality of concentric pipes in a wellbore;
obtaining electromagnetic log data along the plurality of concentric pipes that include an inner pipe and one or more outer pipes; and
identifying a location of at least one pipe coupling on at least one of the plurality of concentric pipes;
processing the electromagnetic log data to determine one or more attributes of the plurality of concentric pipes as a function of depth, wherein the processing uses the location of at least one pipe coupling on the inner pipe to account for effect of the at least one pipe coupling on the one or more outer pipes, and wherein the processing comprises subtracting responses due to the at least one pipe coupling from measured responses for each of the plurality of concentric pipes to obtain a subtracted response;
applying inversion to the subtracted response to obtain the one or more attributes, wherein the one or more attributes comprises pipe thickness.

* * * * *